3,287,386
PROCESS FOR THE PRODUCTION OF TIN ALKYL COMPOUNDS

Wilhelm Paul Neumann, Mulheim (Ruhr), Germany, assignor to Karl Ziegler, Mulheim (Ruhr), Germany
No Drawing. Filed Apr. 26, 1960, Ser. No. 24,670
Claims priority, application Germany, Apr. 30, 1959, Z 7,297
1 Claim. (Cl. 260—429.7)

This invention relates to a process for the production of tin alkyl compounds.

A number of processes have been suggested for the production of alkyl compounds of tin, e.g. the action of Grignard magnesium compounds on tin tetrachloride. However, this reaction does not give a very homogeneous product since, due to the tetravalence of tin and even when using four molecules of magnesium alkyl halide, three series of tin alkyl compounds which, formulated with the chlorides taken as an example, are to be written as $RSnCl_3$, $R_2SnCl_2$, $R_3SnCl$ are formed in addition to the tin tetraalkyls. In the reaction between tin tetrachloride and, for example, magnesium alkyl halides, dialkyl tin dichlorides and trialkyl tin monochlorides are obtained as a rule in addition to tin tetraalkyls. Elaborate and cumbersome separation processes are then necessary for the production of the pure substances from such mixtures.

It was already suggested to produce tin tetraalkyls from tin difluoride and aluminum trialkyls. This reaction takes a largely uniform course provided that the proper relative proportions are used, which is said to be due to the fact that the stable and sparingly soluble aluminum fluoride is formed as one of the reaction products in this case. This process is not applicable to tin tetrachloride since the reaction will again result in a heterogeneous product as may be seen from the following example:

45.6 grams of aluminum triethyl are mixed with a total of 78.1 grams of tin tetrachloride (mol ratio, 4:3) which is carefully added dropwise with exclusion of air, efficient cooling and vigorous stirring. Upon completed mixing, the cooling is discontinued and the mixture is allowed to react for another two hours at room temperature. If a sample of the reaction mixture is now hydrolyzed, about 30% of ethyl groups initially attached to aluminum are still set free in the form of ethane. Ethyl groups attached to tin are not hydrolyzed under these conditions, i.e. they are not able to furnish ethane. When subsequently subjecting the total reaction mixture to hydrolysis, there are obtained 7 grams of tin tetraethyl with 10% of the tin charged, 53.4 grams corresponding to 74% of the initially charged tin as tin triethyl chloride, and 5.9 grams corresponding to 8% of the initially charged tin as diethyl tin dichloride. The result will be the same when using benzene as the solvent or when heating the reaction mixture for some time to 80° or even 120° C. upon completion of the reaction.

Mention is made of this non-uniform course of the reaction in the published specification of German patent application K 20,071 IVb/12o, lines 8–26 of page 1. A similar non-uniform course is taken by the reaction when allowing aluminum trialkyls to react with tin tetrachloride in a molar ratio of 1:1. Under these circumstances, the smooth formation of trialkyl tin monohalides could be expected in case of a smooth stoichiometrical reaction according to $AlR_3+SnCl_4=R_3SnCl+AlCl_3$. Actually, however, in case of the ethyl compounds, only 82.5% of the tin charged as $SnCl_4$ are obtained in the form of organic tin compounds, and these consist of 30%

$$Cl_2Sn(C_2H_5)_2$$

68% $ClSn(C_2H_5)_3$ and 2% $Sn(C_2H_5)_4$.

An attempt to produce homogeneous dialkyl tin dichlorides according to $2AlR_3+3SnCl_4=3R_2SnCl_2+2AlCl_3$ will not have a different result. In this manner, in case of the ethyl compounds, 24% of the $SnCl_4$ was recovered unchanged in addition to 37% of $ClSn(C_2H_5)_3$ and only 33% of $SnCl_2(C_2H_5)_2$.

According to the published German patent application 1,048,275, a uniform course of the reaction can be accomplished for the case of tetraalkyl compounds of tin by adding alkali chlorides to the reaction mixtures. The particular effect of the alkali chloride in this process is based on the fact that equilibria are established in the mixture of aluminum trialkyl and tin tetrachloride, which equilibria involve aluminum chloride and also alkyl aluminum dichloride on the side of aluminum. These two materials give rather stable complex compounds with alkali chlorides. They are removed in this form from the equilibrium and, therefore, the reaction will then proceed completely in the direction toward an extensive transfer of the alkyl groups to the tin. It is obviously a condition for the practicability of the process that at least four alkyl groups are available per tin atom, and this is always the case in the examples of published German patent application 1,048,275. The alkali chloride complexes of aluminum trichloride or of the monoalkyl aluminum dihalides represent solid crystal masses having higher melting points and are difficult to separate from the organic tin compounds.

It has now been found that the behavior of the etherates of the alkyl aluminum compounds in the reaction with tin tetrachloride is quite different from that of the ether-free alkyl aluminum compounds. It is possible in the presence of ether by appropriately selecting the relative proportions of starting materials to produce high yields of dialkyl tin dichlorides, trialkyl tin monochlorides and tin tetraalkyls in reactions which proceed largely uniformly, each of these compounds being obtained separately and without substantial contamination by the other tin-organic compounds. An effect similar to that of the ethers is exhibited by tertiary amines such as, for example, triethylamine, dimethyl aniline, pyridine or quinoline. Particularly suitable alkylating aluminum-organic compounds in addition to aluminum trialkyls are dialkyl aluminum monochloride, sesquichlorides and monoalkyl aluminum dichlorides. The ethers and tertiary amines, respectively, are found upon completion of the reaction in the form of their compounds with aluminum chloride. Of these, the tin-organic reaction products may be distilled off directly so far as this is permitted by their boiling points. The remaining aluminum chloride compounds of the ethers and tertiary amines, respectively, are liquids or low melting materials which are very readily removed from the distillation vessels. As an alternative, the reaction products of the invention may be simply processed by hydrolysis, in which case the ethers or tertiary amines can be easily recovered from the products of the hydrolysis.

The particular advantage of the process of the invention is, of course, only realized if, as was already mentioned, care is taken by properly selecting the relative proportions that the formation of homogeneous reaction products is actually possible, i.e., for the preferential production of dialkyl tin dichlorides, a sufficient amount of the organic aluminum compound must be charged per mol of tin tetrachloride that, if possible, exactly 2 alkyl groups are available, i.e. either 2 mols of monoalkyl aluminum dichloride or 1 mol of dialkyl aluminum monochloride or ⅔ mol of aluminum trialkyl. This does not means, however, that it is absolutely necessary that the corresponding stoichiometrical ratio be accurately and strictly observed within one part per thousand. Some tolerance is, of course, allowed and the care observed needs not be greater than that generally necessary in normal organic-preparative work. Quite homogeneous reaction products are still obtained even when deviating from the required stoichiometric amounts of either starting material by about 10% in each direction. Finally, the advantages of operating in the presence of ether or tertiary amines are obtained even when selecting the relative proportions such that a mixture, say, of dialkyl tin dichlorides and trialkyl tin monochlorides or one of trialkyl tin monochloride and tin tetraalkyl is liable to result, because much better utilization of the tin tetrachloride is accomplished under these conditions than for the case of working without ethers or tertiary amines.

An experiment was described above, wherein 2 mols of aluminum triethyl and 3 mols of tin tetrachloride give 37% (of the theory) of $ClSn(C_2H_5)_3$ and 33% of $SnCl_2(C_2H_5)_2$. Thus, a mixture of about equal amounts of a dialkyl tin dichloride and a trialkyl tin monochloride was formed in this case, but this mixture was only formed at a total conversion of 70%, the remainder of the tin tetrachloride charged being unchanged. It would be easily possible in accordance with the invention to produce a similar 1:1 mixture of dialkyl tin dichloride and trialkyl tin monochloride by allowing aluminum trialkyl and tin tetrachloride to react in a ratio of 0.83:1 in the presence of an ether or tertiary amine. However, in this case, the total tin would be recovered in the form of the mixture of these two materials rather than only 70%. Such an attempt would, of course, have the result that in the same reaction mixture one half of the tin tetrachloride charged would be allowed to react in accordance with the reaction

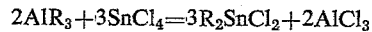

and the other half in accordance with the reaction

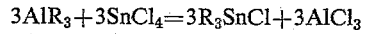

In general, such a mode of operation will not offer an advantage since it is the very nature of the process of the invention to supply homogeneous reaction products. However, the case may occur that especially mixtures of tin compounds of this type are more advantageous in use for any purpose than are the homogeneous compounds alone. It is absolutely possible under these circumstances to operate in the manner described above.

As was mentioned above, the presence of ethers or tertiary amines is essential for the invention. It is unimportant, however, in what manner and in what phase of the reaction these adjuvants of the invention are used. It is possible to work from the beginning with the etherates or tertiary amine compounds of the organo-aluminum compounds or to use an ether as the solvent, i.e. add it initially to the reaction mixture. Finally, as an alternative, the main reaction may be allowed to proceed in the absence of an ether or amine and, at the end, an ether or tertiary amine may be added in an amount which is at least equivalent to the aluminum charged. In this latter case, the initially very complex composition of the reaction mixture undergoes a subsequent change with formation of homogeneous reaction products. It is preferable in this case to heat for some time after the addition of the ether in order that the changes in the reaction mixture may actually occur.

Example 1

78.2 grams of tin tetrachloride are allowed to drop into 46.0 grams of aluminum triethyl while stirring and initially cooling to 0° C. Thereafter, 45 cm.³ of diethyl ether are added and the mixture is heated to 80° C. to bring the reaction to completion. Distillation at 10 mm. Hg gives pure tin tetraethyl which distills at 62–68° C. and is not accompanied by first and last runnings. The yield is 68.1 gms. (97% of theory). The product is free from chlorine and uniformly passes over at 62° C. when distilled again under 10 mm. Hg.

Example 2

46.0 gms. of aluminum triethyl are gradually mixed with 78.2 gms. of tin tetrachloride and 45 gms. of dry triethylamine. Initial cooling permits the reaction to be carried out rapidly, the reaction being terminated at 80° C. Thereafter, the contents of the flask remain liquid even at room temperature. The reaction product is distilled under 10 mm. Hg (boiling point, 62–73° C.) and consists of tin tetraethyl which is free from chloride and triethylamine. Yield: 61.9 gms.=88.2% of theory.

Example 3

53 gms. of aluminum triisobutyl are gradually reacted with 51.8 gms. of tin tetrachloride, following which 28 ml. of diethyl ether are added. Distillation of the reaction mixture under 10 mm. Hg gives 66.1 gms. (95.4% of the theory) of chlorine-free tin tetraisobutyl which distills at 130–132° C.

Example 4

39.1 gms. of tin tetrachloride and subsequently 30 gms. of dibutyl ether are added dropwise to 39.6 gms. of aluminum-tri-n-butyl. After decomposition with water and hydrochloric acid with external cooling, the phases are separated in a separatory funnel and the organic layer is subjected to distillation at 12 mm. Hg. After the dibutyl ether (boiling up to 50° C.), the tin tetra-n-butyl distills at 149° C. Yield: 46.7 gms. corresponding to 90% of the theory.

Example 5

80 gms. of tin tetrachloride are gradually mixed with 22.8 gms. of aluminum triethyl and then with 25 ml. of diethyl ether. The diethyl tin dichloride formed distills at 100–102° C./10 mm. Hg after having obtained first runnings in amount of 2 grams (B.P. up to 80° C.). Yield: 68.1 gms. corresponding to 91.8% of the theory.

Example 6

53 gms. of tin tetrachloride are reacted with 22.8 gms. of aluminum triethyl. Then 25 ml. of dry diethylether are added and the mixture is distilled at 10 mm. Hg. Triethyl tin chloride in amount of 45.1 gms. corresponding to 93.5% of the theory distills at 90–93° C. The chlorine content is 14.6%.

Example 7

52 gms. of tin tetrachloride are allowed to react with 39 gms. of aluminum diethyl chloride diethyl etherate and then the resultant diethyl tin dichloride is distilled off under a reduced pressure (B.P. 101° C./10 mm. Hg). The compound is obtained in amount of 45 gms. (90.6% of the theroy) and has a melting point of 85° C.

Example 8

A total of 110 gms. (91.4%) of pure triethyl tin monochloride containing 14.8% of chlorine (B.P. 92° C./10 mm. Hg) is obtained from 130 gms. of tin tetrachloride and 124 gms. of ethyl aluminum sesquichloride when proceeding in the manner described in Example 2 and after having added 101 gms. of triethylamine. The residue consists of aluminum trichloride triethylaminate.

Example 9

78 gms. of tin tetrachloride are allowed to react with 53 gms. of aluminum-di-n-butyl monochloride at room temperature. Thereafter, 30 ml. of diethyl ether are added. Upon heating to 100° C. for a short period of time, 85 gms. (94.5% of the theory) of di-n-butyl tin dichloride (F=38° C.) are obtained by distillation under a reduced pressure.

Example 10

82 gms. of crystalline tin chloride etherate are added in portions to 22.8 gms. of aluminum triethyl. The reaction mixture is heated to 60° C., residual ether is removed by suction filtration, and the triethyl tin chloride is driven off. B.P. 93–95° C. Yield: 44.8 gms. corresponding to 93% of the theory.

*Example 11*

22.8 gms. of aluminum triethyl are allowed to drop into 81 gms. of tin tetrachloride while stirring and cooling to 0° C. Then 26 gms. of dry dimethyl cyclohexylamine are added. In doing so, the mixture partially solidifies. Distillation of the reaction mixture at 12 mm. Hg first gives a small amount of first runnings and then 65.4 gms. (88% of the theory) of diethyl tin dichloride which solidifies immediately.

*Example 12*

41 gms. of tin tetrachloride are gradually mixed with 19.8 gms. of aluminum-tri-n-butyl and then with 19 gms. of dry tributylamine. Distillation of the mixture gives 42 gms. (90% of the theory) of dibutyl tin dichloride. B.P. 88° C./0.15 mm. Hg.

*Example 13*

19.5 gms. of tin tetrachloride and then 25 ml. of diethyl ether are added dropwise to 36.6 gms. of aluminum-tri-n-octyl. When heated to 60° C., the mixture separates into two layers. The upper colorless layer is withdrawn by siphoning and shaken with 10 ml. of dilute hydrochloric acid and then with water to remove traces of $AlCl_3$. Upon separation and drying of the organic phase, 39.4 gms. (92% of the theory) of tin tetra-n-octyl are obtained. The chlorine content is less than 0.1%. An equimolar amount of diisopropyl ether may be used in place of the diethyl ether.

*Example 14*

43.8 gms. of powdered tin tetrabromide are mixed with 20 ml. of diethyl ether. In doing so, part of the etherate formed is precipitated. After having added dropwise 18.8 gms. of aluminum triethyl etherate while stirring, the reaction is allowed to proceed for about 30 minutes and then the excess ether is removed by suction. Distillation under 12 mm. Hg gives raw triethyl tin bromide which is separated from high boiling last runnings by fractionation. Yield: 24.3 gms. corresponding to 85% of the theory. B.P. 96–97° C. Tin content, 41.3%.

A similar result is obtained with this recipe when using an equimolar amount of triethylamine in place of the ether.

*Example 15*

37.6 gms. of aluminum triethyl etherate are added dropwise at about 0° C. to 123.3 gms. of dry tin tetraiodide in form of fine crystals. In doing so, the mixture becomes liquid. The volatile constituents are driven off at 12–15 mm. Hg (bath temperature up to 180° C.) and subjected to fractional distillation. Yield: 54.2 gms. of triethyl tin iodide (83% of the theory), B.P. 120–122° C. Tin content, 35.3%; iodine content, 38.4%.

What I claim is:

Process for the production of tin alkyl compounds which comprises reacting tin tetrahalide with an aluminum compound selected from the group consisting of aluminum trialkyls, dialkyl aluminum monohalides, monoalkyl aluminum dihalides and alkyl aluminum sesquihalides in the presence of a tertiary amine having the formula $NR'_3$ wherein $R'$ represents a member selected from the group consisting of alkyl radicals having up to 8 carbon atoms and cycloalkyl radicals pyridine and quinoline and recovering the tin alkyl compound formed by replacement of at least one of the halogen atoms of the tin tetrahalide with an alkyl radical

References Cited by the Examiner

UNITED STATES PATENTS

| | | | |
|---|---|---|---|
| 2,923,725 | 2/1960 | Nowlin et al. | 260—448 |
| 3,027,393 | 3/1962 | Jenkner | 265—429.7 |

FOREIGN PATENTS

| | | |
|---|---|---|
| 547,962 | 9/1956 | Belgium. |
| 1,120,344 | 7/1956 | France. |
| 1,048,275 | 1/1959 | Germany. |

TOBIAS E. LEVOW, *Primary Examiner.*

L. BROWN, W. J. VANBALEN, E. C. BARTLETT, W. F. W. BELLAMY, F. R. OWENS,
*Assistant Examiners.*